US008370757B2

(12) United States Patent
Tinari et al.

(10) Patent No.: US 8,370,757 B2
(45) Date of Patent: Feb. 5, 2013

(54) INTERFACE AND METHOD FOR EXTENSIBLE GROUPING OF SCREEN ELEMENTS IN REAL TIME

(75) Inventors: Phil Tinari, Los Angeles, CA (US); David Brookler, Los Angeles, CA (US); Paul Weinberg, Los Angeles, CA (US)

(73) Assignee: SAP AG, Walldorf (DE)

( * ) Notice: Subject to any disclaimer, the term of this patent is extended or adjusted under 35 U.S.C. 154(b) by 400 days.

(21) Appl. No.: 11/192,990

(22) Filed: Jul. 30, 2005

(65) Prior Publication Data

US 2007/0028181 A1 Feb. 1, 2007

(51) Int. Cl.
*G06F 3/048* (2006.01)
(52) U.S. Cl. .................. 715/764; 345/619; 345/681
(58) Field of Classification Search .................. 715/764; 345/619, 681
See application file for complete search history.

(56) References Cited

U.S. PATENT DOCUMENTS

| | | | | | |
|---|---|---|---|---|---|
| 5,471,578 | A | * | 11/1995 | Moran et al. | 715/863 |
| 5,564,004 | A | * | 10/1996 | Grossman et al. | 715/835 |
| 5,751,283 | A | * | 5/1998 | Smith | 715/798 |
| 5,754,179 | A | * | 5/1998 | Hocker et al. | 715/835 |
| 5,760,774 | A | * | 6/1998 | Grossman et al. | 715/835 |
| 5,767,852 | A | * | 6/1998 | Keller et al. | 715/835 |
| 5,778,382 | A | * | 7/1998 | Hatori | 707/1 |
| 5,801,699 | A | * | 9/1998 | Hocker et al. | 715/837 |
| 5,838,321 | A | * | 11/1998 | Wolf | 715/803 |
| 5,844,559 | A | * | 12/1998 | Guha | 715/846 |
| 5,861,886 | A | * | 1/1999 | Moran et al. | 715/863 |
| 5,874,962 | A | * | 2/1999 | de Judicibus et al. | 715/789 |
| 5,889,523 | A | * | 3/1999 | Wilcox et al. | 715/854 |
| 5,903,268 | A | * | 5/1999 | Hirayama | 715/799 |
| 5,990,862 | A | * | 11/1999 | Lewis | 715/858 |
| 6,163,317 | A | * | 12/2000 | de Judicibus | 715/853 |
| 6,237,142 | B1 | * | 5/2001 | Brodsky et al. | 717/165 |
| 6,259,807 | B1 | * | 7/2001 | Ravkin | 382/133 |
| 6,396,487 | B1 | * | 5/2002 | Jameson | 715/788 |
| 6,567,070 | B1 | * | 5/2003 | Light et al. | 345/157 |
| 6,654,035 | B1 | * | 11/2003 | DeStefano | 715/798 |
| 6,816,176 | B2 | * | 11/2004 | Laffey et al. | 715/860 |
| 6,918,092 | B2 | * | 7/2005 | Talley et al. | 715/769 |
| 6,934,911 | B2 | * | 8/2005 | Salmimaa et al. | 715/744 |
| 7,027,071 | B2 | * | 4/2006 | Chao | 345/622 |
| 7,176,943 | B2 | * | 2/2007 | Meyers et al. | 345/619 |
| 7,185,278 | B1 | * | 2/2007 | Simmons | 715/521 |
| 7,231,609 | B2 | * | 6/2007 | Baudisch | 715/769 |
| 2002/0154149 | A1 | * | 10/2002 | Hebbar et al. | 345/681 |

(Continued)

*Primary Examiner* — Robert Stevens
*Assistant Examiner* — Eric Wiener
(74) *Attorney, Agent, or Firm* — Buckley, Maschoff & Talwalkar LLC

(57) ABSTRACT

When a set of screen elements are identified as a family a bounded extent is placed around the identified elements. Items can be automatically grouped based on their association with a set of data defined in a DBMS as a family, for example. When one of the elements within the group is moved, the extent automatically resizes to a new geometry that fits around each of the elements within the group. If an element within the group is moved against the extent and then extended beyond the boundaries of the extent, the extent automatically resizes to cover a bigger area; if an element within the group that is against the extent is moved inside the boundary of the extent, the extent automatically resizes to cover a smaller area. It is possible to nest a set of these extensible groups within a single extensible group thereby providing maximum flexibility while still maintaining optimal flexibility. In addition, it is possible to "unlink" an item so that it maintains its association with the group but does not effect the extent.

13 Claims, 5 Drawing Sheets

U.S. PATENT DOCUMENTS

| | | | |
|---|---|---|---|
| 2002/0154169 A1* | 10/2002 | Talley et al. .................. | 345/769 |
| 2003/0179235 A1* | 9/2003 | Saund et al. .................. | 345/764 |
| 2004/0165010 A1* | 8/2004 | Robertson et al. ............ | 345/805 |
| 2005/0125742 A1* | 6/2005 | Grotjohn et al. .............. | 715/799 |
| 2005/0165829 A1* | 7/2005 | Varasano ....................... | 707/102 |
| 2007/0050710 A1* | 3/2007 | Redekop ....................... | 715/523 |

* cited by examiner

INTERFACE AND METHOD FOR EXTENSIBLE GROUPING OF SCREEN ELEMENTS IN REAL TIME

FIELD OF THE INVENTION

One or more embodiments of the invention are directed to the field of computer software. More particularly, but not by way of limitation, the invention relates to an interface for associating screen elements to enable extensible grouping of the screen elements in real time.

BACKGROUND OF THE INVENTION

Various software applications exist with mechanisms for grouping and ungrouping graphical elements within a screen region. For example, the majority of graphic design and other programs having a need to position graphical elements (e.g., MS Visio, MS Powerpoint, Adobe Illustrator, etc. . . . ) have a way to associate a set of components depicted on the screen and then allow movement of those components as one element. Associating a group of independent screen elements together into one block of elements is referred to as grouping. Once a grouping is made elements within the group are moved as a block and operations performed on one of the screen elements within the group occur to all of the elements within the group. Hence when one of the screen elements within the group is moved each of the other screen elements within that same group also move and although the distance between each of the screen elements remains unchanged the position of the entire block changes when moved. A group of 5 screen elements can thus be moved from one location to another within the graphical user interface by selecting the entire group and dragging that group from one location to the other via a pointing device such as a mouse or trackball. As stated above the distance between each of the screen elements and general layout of the elements within the block remains unchanged. This means that if two of the screen elements are positioned in a way that forms a certain shape (e.g., a flow chart or other arranged shape) the integrity of the shape is maintained when one of the elements is moved by having the other elements accompany the moved elements and maintain the distance and position relative to the moved element. Because grouping maintains the layout characteristics of the screen elements within the group, users generally form a group once the layout is in a relatively final form. For instance, after creating a group of 5 screen elements users cannot adjust the distance between the other screen elements without affecting the entire group unless an operation referred to as ungrouping is performed.

Ungrouping disassembles the group by breaking the relationship between screen elements that belong to the group. When a screen element is no longer part of the group it is then feasible to perform operations on the ungrouped element independent of the other elements. For instance, users can then move, delete, copy, or modify the ungrouped element without automatically performing the same operations on neighboring screen elements.

The problem with current grouping techniques is that they do not provide users with a mechanism to maintain the benefits of association with a group while having the flexibility of independent layout. Moving an element of the group require that element be disassociated from the group. Another problem current grouping techniques have is that visual queues that relate the screen elements to underpaying data characteristics are non-existent or minimally helpful. Hence there is a need for an interface the enables the association of layout elements within a graphical user interface via a common set of characteristics and methods relating to generating and using such associations within the context of document publication.

SUMMARY OF THE INVENTION

One or more embodiments of the invention relate to a method for associating a family of layout elements and then grouping those layout elements within an extensibly bounded region of a graphical user interface in a way that provides visual queues about how each of the respective screen elements within the interface are associated. Such extensible grouping has many uses in the context of graphic user interfaces but is particular useful for purposes of document publication where the document to be published is linked to a database of information and objects that function as the source of screen elements. For instance, in the case where a set of screen elements that are to be inserted into a publication belong to the same family, one or more embodiments of the invention allow the screen elements to retain their family traits while providing visual queues that indicate which elements are within the family.

In the context of the present invention images or other graphic objects that belong to a particular family are obtained from the database and presented via a graphical user interface as a set of one or more screen elements. Each set of screen elements is moveable about the graphical user interface and can, for example, be positioned in a desired location within a document. For instance, in cases where the user is using the graphical user interface to generate a document to be published (e.g., a catalog, web page or other document), the user can insert each of the screen elements from a particular family into the document and then manipulate the screen elements to achieve a desired layout.

In one or more embodiments of the invention a group of screen elements is defined by initiating a group items command that associates together the screen elements that belong to particular family or any other logical grouping. A group is customizable in that the user can define what elements from a family belong to the group and can optionally include screen elements that do not belong to the family. Users can define a group by selecting two or more screen elements and then choosing to associate the selected screen elements via a "group items" command. Once the screen elements are grouped the layout of the elements becomes optionally fixed and hence the individual elements are moveable as a collective block. Moving grouped elements together as a block enables the user to position the entire group anywhere in the document while still maintaining the layout integrity of the group.

Screen elements that are grouped in the manner described are typically confined within a bounded region that defines the document itself. The screen elements may also be contained within a part of the document where the screen elements are to stay in order to meet the layout requirements (e.g., a column, window, etc. . . . ). This bounded region defines the edge of the page or the screen region where the screen elements are to reside. When publishing a document such as a catalog, web page or other document type that provides a specific region for certain types of screen elements, the screen elements are limited to that location. For instance, in publishing a product catalog, images relating to a particular family (e.g., manufacture) may need to be placed in a screen region that is adjacent to the list of products that particular manufacture makes. The screen elements may optionally be limited to a column, row, or any other region within the document being generated.

In one or more embodiments of the invention a bounded extent is placed around the screen elements when a set of screen elements is first identified as a family. Items can be automatically grouped based on their association with a set of data defined in a DBMS as a family, for example. When one of the elements within the group is moved, the extent automatically resizes to a new geometry that fits around each of the elements within the group. If an element within the group is moved against the extent and then extended beyond the boundaries of the extent, the extent automatically resizes to cover a bigger area; if an outermost screen element within the group (e.g., one that is against or in proximity to the extent) is moved inward towards a center point, the extent automatically resizes to cover a smaller area. It is also possible to nest a set of extents within a single extensible group thereby providing maximum layout flexibility. In addition, it is possible to "unlink" an element so that it maintains its association with the group but does not affect the extent. Alternatively an element can be unlinked but still maintain the ability to affect the extent when moved against or away from its border. The outermost edge of the extent (e.g., its boundary) provides the user with visual queues that identify which screen elements belong to the family and can also provide visual queues about the appropriate layout location for the screen elements.

DETAILED DESCRIPTION OF THE INVENTION

Figure 1:
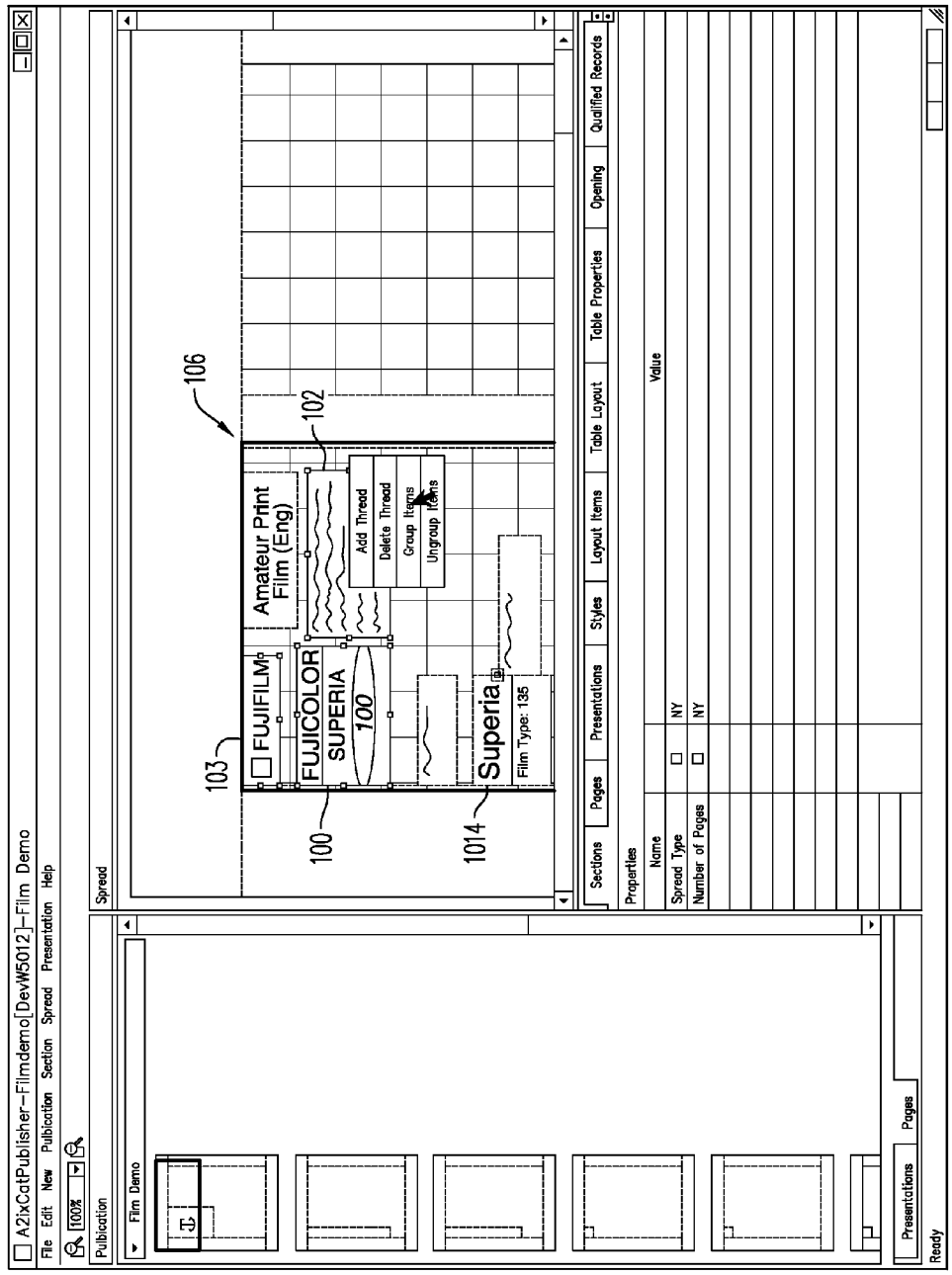
FIG. 1 shows a graphical user interface that contains a series of screen elements to be grouped.

One or more embodiments of the invention are directed to an innovative interface that overcomes the problems inherent in prior art grouping approaches by implementing a unique method for associating a family of layout elements and then grouping those layout elements within an extensibly bounded region of a graphical user interface. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features and functions well known to those of ordinary skill in the art have not been described in detail so as not to obscure the invention. Readers should note that although examples of the invention are set forth herein, the claims, and the full scope of any equivalents, are what define the metes and bounds of the invention.

The invention has particular applicability in publication environments where layout elements within a document are linked to one or more back end systems that are used to provide the layout elements or data associated with the elements. For instance, in a product catalog information about the product families and data elements to be contained in a catalog publication are initially obtained from a DBMS and provided to a publishing interface that implements one or more aspects of the invention described herein. The information provided to the publishing interface is what relates the data elements to a particular family or other commonality. These data elements are the visual components users utilize to layout a document and are referred to herein as screen elements. In the majority of cases the phrase screen element refers, but is not limited solely to, any separable element within a graphical user interface that can be placed into the body of a document to be published. The term may however have other meanings depending on its context. An image file, text file, or other moveable objects are some examples of screen elements. If a user were to utilize one or more embodiments of the invention described herein to layout and subsequently publish a web page or other document, the image files and text files that make up the final document submitted for publication might be referred to as screen elements.

Screen elements can be organized so that elements having similar attributes or characteristics are designated as belonging to the same association. In one or more embodiments of the invention a group of screen elements is defined by initiating a group items command that associates together the screen elements that belong to particular family or any other logical grouping. A group is customizable in that the user can define what screen elements belong to the group. Users can, for instance, group screen elements together that belong to the same family or alternatively choose to group screen elements that do not belong to the same family but share some other commonality. Users can define a group by selecting two or more screen elements and then associating the grouped items via the "group items" command. In one embodiment of the invention users are able to define what common characteristic(s) associate the screen elements so that the commonalities can be later looked up or referenced. If the user opts to group by family the family information can be looked up by reference. User can also form a soft group in the same manner described herein in the context of a group.

A family is a detailed arrangement of data that groups items according to the category value and other criteria. For example, products in a certain category, such as paintbrushes, may also be grouped by manufacturer. These relationships are referred to as families. Generally speaking, a family can be defined as a set of records, in a table, related by one or more common fields having the same value. These families may also have additional fields of common information, such as images, logos paragraphs of descriptive text, bullets of specifications, and other data. Families provide a way of identifying relationships by fixing one or more common fields and/or attribute values. A more detailed description of what families of data represent is described in U.S. Pat. No. 6,910,044 entitled "Method and Apparatus for Structuring, Maintaining, and Using Families of Data," the specification of which is incorporated herein by reference.

In contrast to the prior art grouping techniques which allow for multiple objects within an interface to be grouped regardless of the data source and their relationship to other objects within that same data source, screen elements can be automatically related based on their association with a set of data defined in a DBMS; as a family, for example. When screen elements are identified as being members of a family an extent is placed around the identified elements. An extent is a contiguous space that surrounds a plurality of screen elements. In one or more embodiments of the invention the edges or borders of the extent are visually highlighted to signify that screen elements within the extent are somehow associated. When one of the elements within the extent is moved against and then beyond the interior border of the extent, the extent automatically resizes to a new geometry that fits around each of the screen elements within the extent. For instance, if an element within the extent is moved against the border and then extended beyond the boundaries of the extent, the extent automatically resizes to cover a bigger area; if an outermost element within the extent is moved towards the center of the extent, the extent automatically resizes to cover a smaller area. It is possible to nest a set of these extensible groups within a single extensible group thereby providing maximum flexibility while still maintaining visual queues about the relationships between the screen elements. In addition, it is possible to "unlink" a screen element so that it maintains its association with the group but does not affect the extent. The system also provide a way to "unlink" a screen element but affect the extent (e.g., as in a soft group). An unlinked screen element can move independent from the layout group, but may cause the extent to be resized in cases where the element is moved beyond (or optionally away from) the extent boundary.

Various embodiments of the invention are now illustrated in the context of the exemplary figures.

Grouping Screen Elements

FIG. 1 shows a graphical user interface that contains a series of screen elements to be grouped. Screen element 100, 102, 103 and 104, for example are image files that are placed within a document to be published. To define a group the user operates a selection device such as a mouse or keyboard to identify which screen elements are to be assigned to a particular group. In FIG. 1, screen elements 100, 102, and 103 are selected and assigned to the group via a group items command. When initiated the group items command fixes the physical proximity between each of the selected screen elements. The system also has mechanism for associating the screen elements based on other criteria such as what family the screen elements belong to. This association is determined by the user or looked up by reference to the underlying database where the screen elements are stored. Screen elements 100, 102, and 103, for instance, may belong to the same family of "manufacture." In the example given in FIG. 1, screen elements that belong to the same family and are grouped via the group items command are bounded by an extent that indicates which screen elements are within the same family.

Extent 106, for example defines the screen region within which screen elements 100, 102 and 103 are located. Extent 106 may take various forms and change based on the case. In instances where all of the grouped items belong to the same family, extent 106 surrounds or partially surrounds the selected screen elements in order to provide visual queues that these grouped screen elements are members of the same family. In cases where the user selects screen elements that are related, but not members of the same family, the system may include the non-family member into the group but provide visual queues that identify the non-family member as not belonging to the family. These visual queues include designations such as color or other differentiating methods such as size or appearance. Although the necessity to associate members of the same family with non-family members is not common the invention is configured to relate different families together within a single bounded extent. In such cases (or even when families are not within the same extent) the system may provide visual queues that enable users to distinguish the characteristics of each respective screen elements. In the instances where two families are grouped together, the first family may have one set of visual characteristics whereas the second family (which may or may not be part of the same association or group) is given a second visual characteristic.

In the case where screen elements belonging to more than one family are selected and grouped the system may optionally generate more than one extent. Hence when screen elements from more than one family are grouped numerous extents may surround the members of each respective family. These nested extents may overlap with one another and also have associated visual queues (such as color) that indicate which family a particular screen element belongs to.

Figure 2:
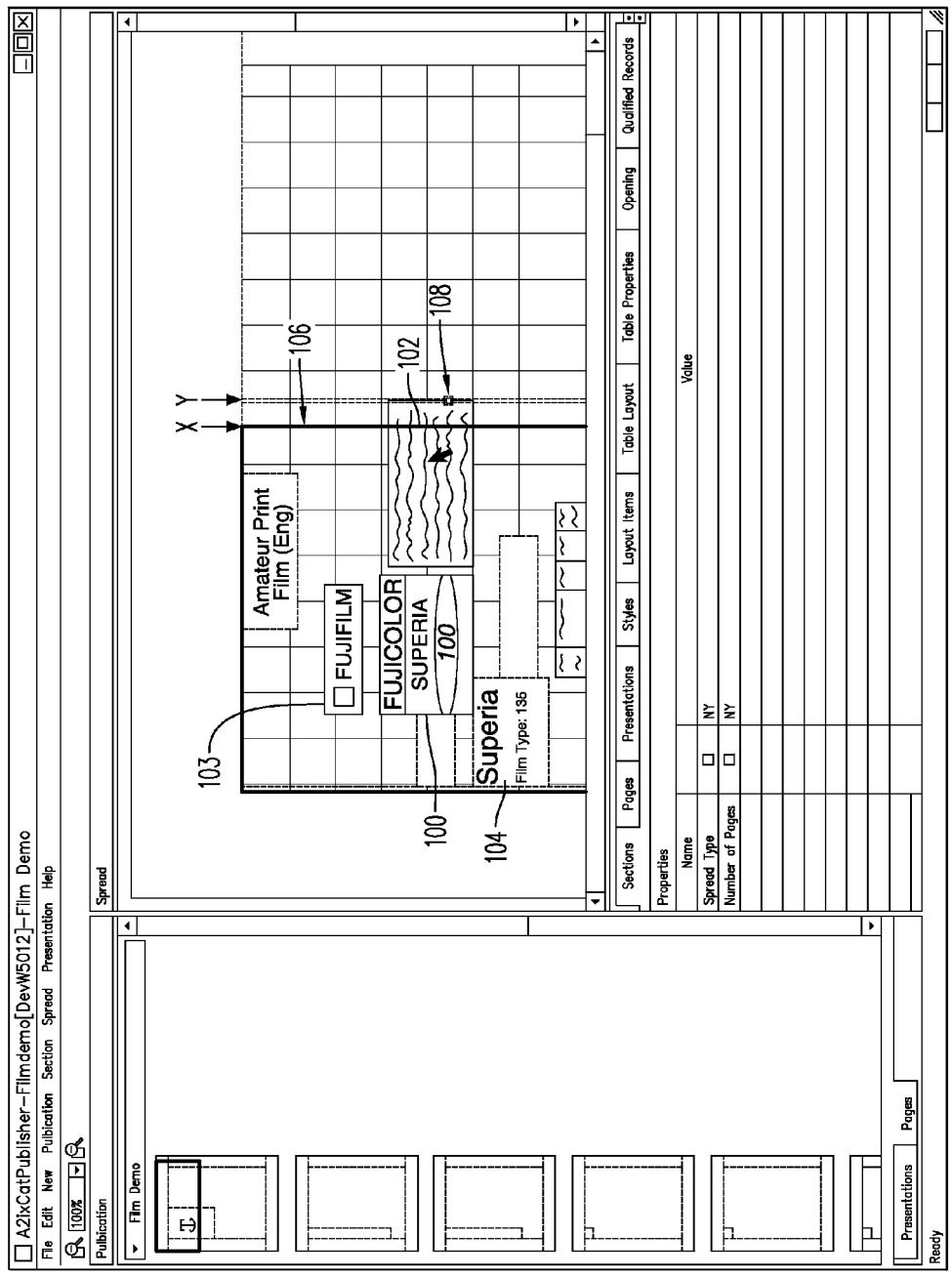
FIG. 2 shows the extensible nature of the boundary when screen elements are moved against the boundary.

FIG. 2 shows the extensible nature of the boundary when screen elements are moved beyond the boundary of the extent. Extent 106, for example, automatically adjusts its right most edge when screen element 102 is pushed against the boundary line that makes up extent 106. In one or more embodiments of the invention screen elements have one or more anchor points that provide an indication to the user that the extent boundary is being adjusted from its prior position. In FIG. 2 screen element 102 has an anchor 108 that changes colors in order to indicate to the user when the element has moved against its current boundary line. If the user wishes to move the extent boundary it can accomplish this task by moving the group of screen elements against the boundary. When the closest element within the group comes in proximity with the extent the element's anchor point optionally changes state. If the user moves the screen element against the extent boundary the location of the boundary is adjusted to account for the new position of the screen element. FIG. 2 depicts this instance and shows that the extent moves from location X (see FIG. 1) to location Y (see FIG. 2) when the user moves the screen element against or in proximity to the extent boundary. In cases where the extent boundary is directly adjacent to another set of bounded screen elements the extents may overlap but still generally surround the screen elements that belong within the extent (screen elements 100, 102, 103 and 104) (e.g., those from the same family).

Soft Grouping of Screen Elements

Figure 3A:
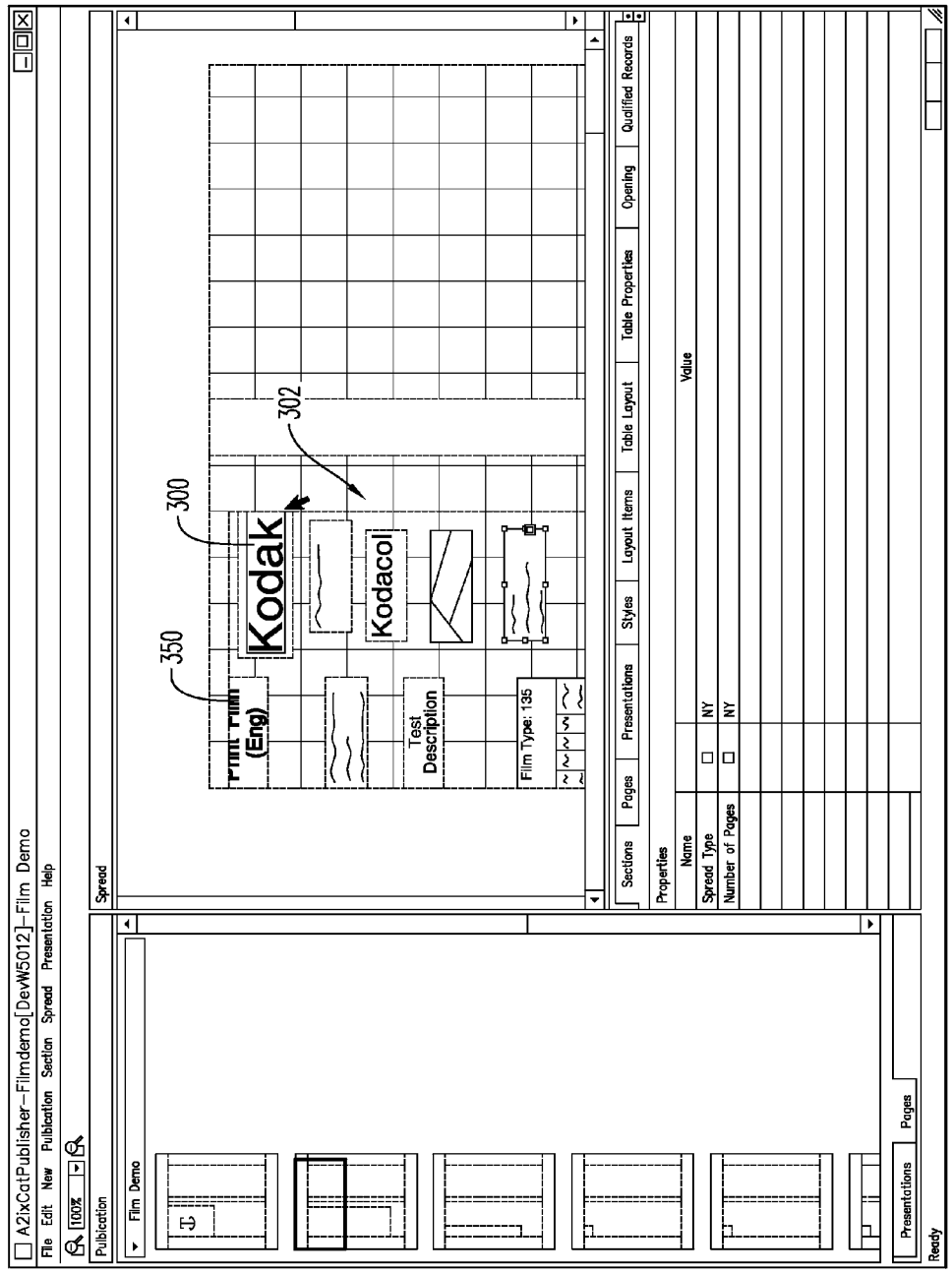
FIG. 3a illustrates a set of screen elements that are extensibly grouped together in a way that provides visual indicators as to each elements association, but minimizes the proximity based restraints of the grouping.
Figure 3B:
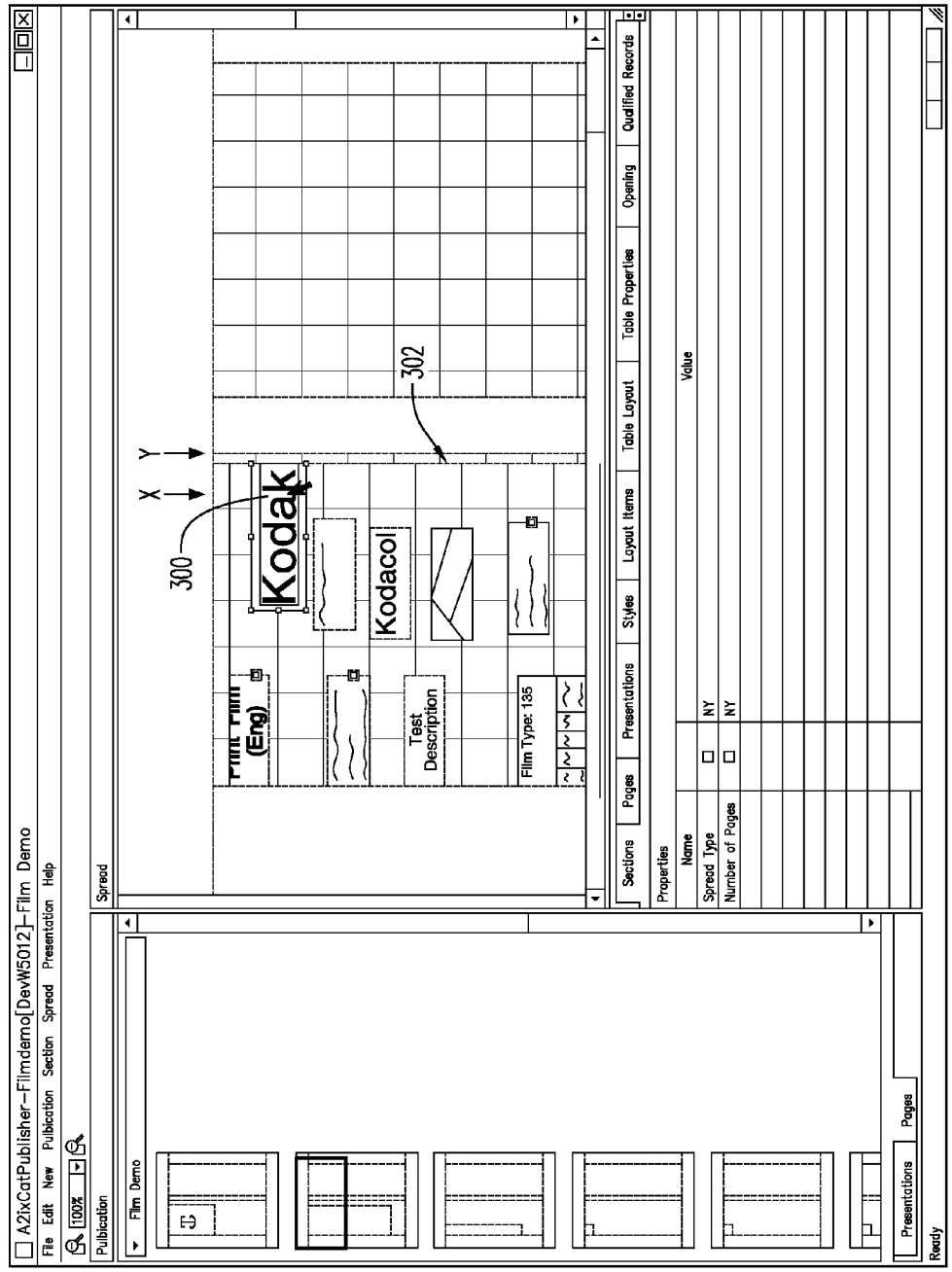
FIG. 3b illustrates a set of screen elements that are extensibly grouped together in a way that provides visual indicators as to each elements association, but minimizes the proximity based restrains of the grouping.

FIG. 3a illustrates a set of screen elements that are extensibly associated together in a way that provides visual indicators as to each elements association, but minimizes the proximity based restraints of the grouping. In this case users can independently move each screen element within the bounded extent for the group. Hence, although the screen elements within the boundary defined by the extent belong to the same association (e.g., family) the operator can move each screen element independent of the other elements. Screen element 300, for instance, is moved from position X of FIG. 3a to position Y of FIG. 3b without impacting the screen position of the other elements. Extent 302, which indicates the confines of where the screen elements are to reside is resizable by moving a particular screen element into the boundary. When screen element 300, for instance, nudges against the extent boundary, the boundary moves position to expand the area within which the associated screen elements reside. In FIG. 3b the dashed line shows the outermost boundary of extent 302. This grouping technique (referred to as soft grouping) enables users to have the benefits of grouping screen elements together by characteristics such as family while still maintaining general layout flexibility.

In one or more embodiments of the invention the extent defines a boundary around one or more edges of the area within which the grouped screen elements are to be placed in the document. The initial position and area of the extent is defined by the size of the screen elements and can be customized by the user to fit the user's layout requirements. The user can increase the size of the extent by moving screen elements against an interior boundary of the extent and can optionally decrease the extent by initiating a mode that reduces the overall area of the extent to cover a minimum region defined by the position of the screen elements. If for instance, the user expands the extent but then decides to move the screen element that forced the expansion back to its initial position the user can return the extent back to its original position in cases where such a result is desired. Hence the extent is generally resizable to an area that surrounds but does not extend far beyond the outermost edges of screen elements associated with the extent.

Edge Control of Extents

Although the border that makes up the extent is intended to identify a set of associated screen elements (e.g., by family) and also functions as a layout guide for the user, the invention contemplates variations to this concept. For instance, the position and area of the extent can be fixed so that it acts as a window or mask that sits above the screen elements. In this case screen elements that are moved beyond the interior boundary of the extent are partially obscured from view and/or completely obscured from view. Hence the user can choose to show only a part of a screen element by moving the screen element under and extent that has been set to act as a mask. For purposes of providing the user with maximum control one or more of the border elements that define the geometry of the extent can be set to mask screen elements that pass beyond the border elements interior edge. If, for example, the extent takes the form of a rectangle due to the position of the screen elements, the top most border element of the extent can be set to hide screen elements that pass beyond its interior border. In FIG. 3a screen element 350 has passed beyond this topmost interior edge that makes up extent 302 and is thus partially obscured from view. However, as FIG. 3a depicts screen elements that are moved beyond the right edge of extent 302 causes the extent to automatically resize to fit the placement of the new screen element. Thus the user can control the characteristics of each edge of the extent and define whether the edge is to function as an extensible edge or fixed edge which screen elements pass visibly under. Each of the edges can have the same characteristics in this regard or be given different characteristics.

When a screen element is moved into a position that causes the border of one extent to contact the border of another extent the extents can overlap or be set to optionally adjust without overlap. When the extents are in a mode to avoid overlaps the geometry of each extent automatically adjusts when one extent contacts or overlaps with another. Hence each of the screen elements that are associated together by family or any other attribute or characteristic are visibly within a closed region that visually identifies the elements as belonging to a single association or relationship. Screen elements from one association cannot cross into the closed region of another association without adjusting the extent boundaries that signify the separate associations. Put simply each screen element stays within the boundaries of its own extent.

Color Coding

In one or more cases systems embodying the invention make use of a color-coding scheme to provide an additional level of visual queues to the user as to which screen elements belong within which association or group. This color-coding is only for purpose of document layout and does generally not modify the visual appearance of the document that is to be published. When the user is designing a document to be published (e.g., in a layout mode) screen elements defined as being within a first association or group, for instance, may be colored as red where screen elements defined as being members of a second association or group may be colored in a different way (e.g., green). The precise method by which such coloring is achieved various in accordance with the visual preferences of the user and is not limited to one specific methodology. However, for purposes of illustration a number of examples are given. When screen elements are initially associated or grouped the user may designate the screen elements as having a specific color and type of coloring. As an example the user may designate the screen elements as having a shade of red and indicate that the coloring is to be displayed in the form of a border color around each independent screen element. Alternatively the user may designate that the color is to be a drop shadow, overlay or any other visible enhancement to the screen elements within the defined association or group. Screen elements from different associations or groups are given different colors so that the user can distinguish which elements belong to which association or group.

Multi-Page Environments

Extents typically encompass screen elements within a specific document page and are thus limited to being on one page of the document. However, in cases where layout necessitates that screen elements from the same family or group be placed on different pages of the same document certain aspects of the extent may be the same across different pages. The coloring associated with each extent, for example, may be the same for all screen elements that belong to the same family, even when the screen elements reside on different pages. Optionally systems embodying one or more aspects of the invention may also run extents across multiple pages. However such an approach would typically, but not always, be limited to instances where a user had a display that was capable of showing more than one page of a document. For example, if the user were viewing two pages adjacent to one another at the same time and screen elements from the same group were on the first and second page, the extent might extend across both pages in order to surround the screen elements. As graphic designers are increasingly using larger displays to layout documents situations where such multi-page extents are needed may arise.

General Methodology

Figure 4:
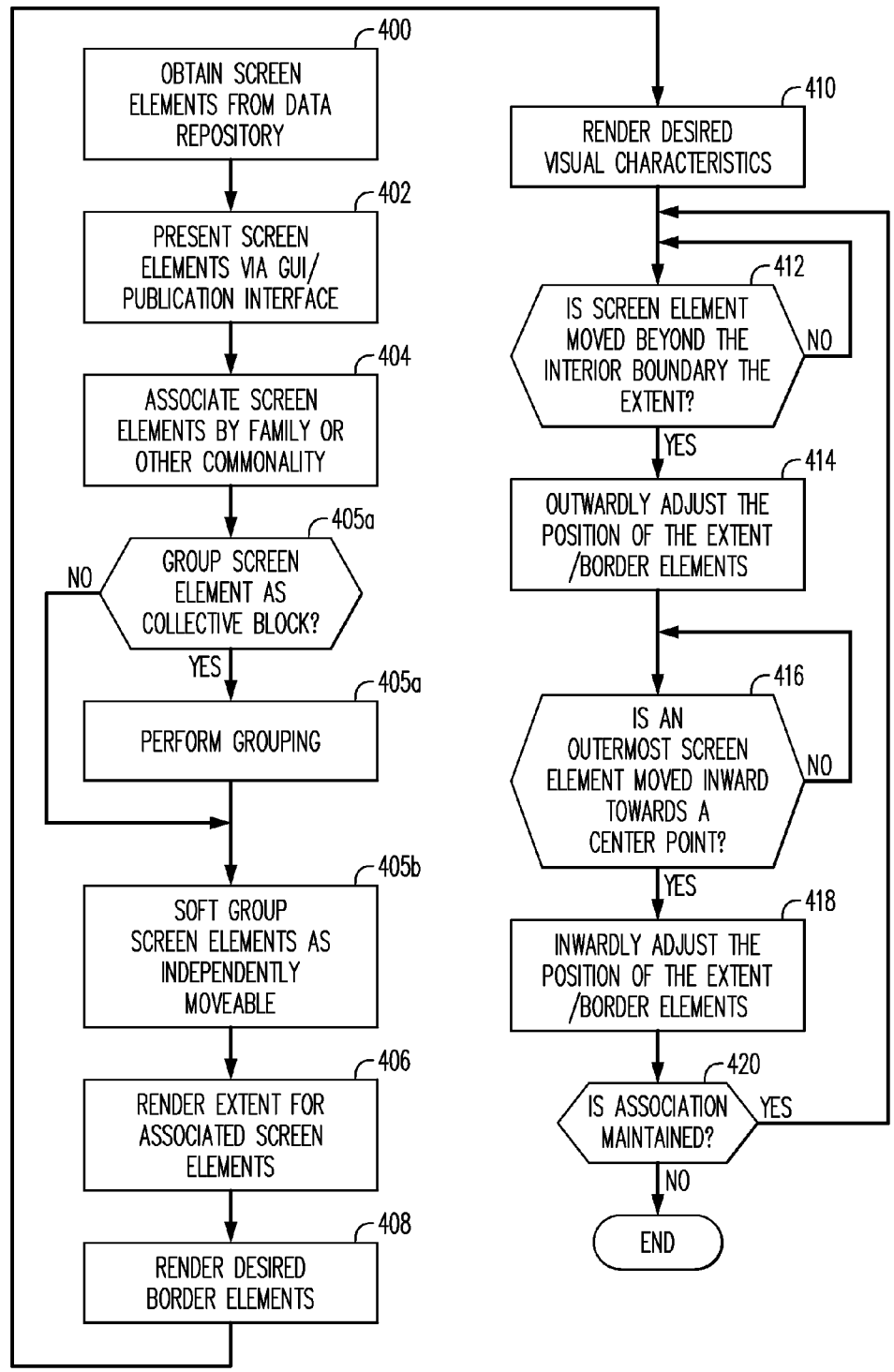
FIG. 4 is a flowchart that illustrates a method for extensibly grouping screen elements within a graphical user interface in accordance with one or more embodiments of the invention.

FIG. 4 is a flowchart that illustrates the general method for extensibly grouping screen elements within a graphical user interface in accordance with one or more embodiments of the invention. Variations from this specific method by way of sequence or the addition or deletion of certain steps are within the scope and spirit of the invention. At step 400 the system obtains the initial screen elements (e.g., image or text data) from a data repository such as a database or other organized data storage. Once the initial screen elements are obtained these elements are provided to a graphical user interface for further manipulation by the user (e.g., 402). In one example, the screen elements are loaded into a screen region representative of a document to be published (e.g., a publication interface). In such cases the user is able to move the screen elements about the document in order to arrive at the optimum layout.

The user or the system determines if there is an association between the screen elements within the graphical user interface (e.g., 404) and provides mechanisms for setting different types of associations. Screen elements may be associated by family or simply related by commonalities such as the visual or underlying data characteristics or attributes of the elements. The screen elements within an association (or group as is discussed below) may provide visual queues (e.g., color) to the user to indicate which elements belong to which association.

Associated screen elements may be grouped or soft grouped. Once screen elements are group the screen elements may be moved as a collective block (e.g., 405*a*). Hence the distance between the screen elements is maintained so that the layout remains the same when the elements are moved. Alternatively the screen elements can be grouped as a soft group which maintains the underlying association between each of the elements that belong to the group but enables the elements to move independent of one another (e.g., 405*b*). Hence movement of one screen element does not cause movement of other elements within the group. Both these groupings are feasible and users may unlink one or more screen elements from a group but still maintain the group characteristics. Hence screen elements that are associated and hence within an extent may utilize both grouping and soft grouping. Three screen elements, for example, might be grouped and move collectively and another two elements might belong to the same association but be soft grouped so as to allow movement independent of the other screen elements within the association. Users may use a selection component configured to obtain input from the user that designates which screen elements belong to a group. For instance, a pointing device, such as a mouse keyboard or other input device may serve as the mechanism by which the user indicates what group each screen element belongs to and also serves as the device by which to move screen element around the graphical user interface. The system may decide grouping according to defaults.

When an association between elements exists the system renders an extent around the associated elements (e.g., 406). The extent is typically a contiguous area that logically or visually surrounds the associated screen elements and has at least one visible border or edge element (e.g., 408). Extents may be nested within one another and surround subgroups of the defined groups that fall within the extent. In some cases all of the border elements (e.g., a line, lines or other geometric unit) are visible whereas in other cases only a portion of the border elements are visible. The border element may for instance comprises a line that resides adjacent to the outermost one of the screen elements positioned within the extent. The shape and color of the extent may optionally vary per group or be the same per group (e.g., 410). When at least one of the screen elements within the associated group is moved against and beyond one or more of the interior edge of the extent's border elements the border elements in contact or close proximity to the moved screen element are moved from one location within the graphical user interface to another (e.g., 412, 414). In the case where a screen element is moved side to side, the border element of the extent moves in the same direction the screen element is moved and stays perpendicular to the screen element that is moved. When the screen element that is farthest from the extent's center point is moved inward (e.g., toward the center point), the extent boundary adjusts inward so that the extent does not cover a larger area than needed (e.g., 416, 418). So long as the association between screen elements is maintained the boundary of the extent is adjustable in accordance with the placement of the screen elements within the interface. When the association dissolves, either by command or by a definition the extent and hence the need to adjust the boundaries of the extent is no longer present.

Hence an interface for associating screen elements to enable extensible grouping of the screen elements in real time has been described in the context of the examples given throughout this specification. Readers should note however that it is the claims, and the full scope of their equivalents that define the boundaries of the invention.

What is claimed is:

1. In a computer system, a method for extensibly grouping layout elements within a graphical user interface comprising:
   obtaining a plurality of initial layout elements from a data repository;
   providing said plurality of initial layout elements from said data repository to a graphical user interface that renders a graphical user interface display;
   determining an association between at least two of said plurality of initial layout elements to derive a group comprising a plurality of associated layout elements, wherein said associated layout elements of said group are movable as a collective block while still maintaining an existing layout of said plurality of associated layout elements;
   rendering an extent surrounding said plurality of associated layout elements, said extent comprising at least one visible border element displayed within the graphical user interface display; and
   unlinking at least one layout element selected from said group by a user, wherein said association is maintained such that said at least one unlinked layout element remains in said group and moves with said group as a collective block, and wherein said at least one unlinked layout element is individually movable independently from others of said plurality of associated layout elements, and further wherein the extent is configured to automatically grow responsive to the user's movement of an unlinked layout element to a location beyond the at least one border element to a location outside the extent and also to automatically shrink responsive to the user's movement of an outermost unlinked screen element to a location closer to a center within the extent, said group including the same plurality of layout elements before and after said user's movement of the unlinked layout element.

2. The method of claim 1 wherein said data repository comprises a database having image data capable of serving as said plurality of initial layout elements, wherein said association to derive said group is automatically determined based on said database.

3. The method of claim 1 wherein said graphical user interfaces comprises a region that enables said plurality of initial layout elements to be inserted into a document for purposes of subsequent publication.

4. The method of claim 2, wherein said association to derive said group is automatically determined based on a family relationship stored in said database, said family relationship comprising at least a category value.

5. In a computer system, a method for extensibly grouping screen elements within a publishing interface comprising:
   identifying a plurality of screen elements displayed on a publishing interface, wherein said plurality of screen elements are related based on a family relationship stored in a database;
   designating said plurality of screen elements as belonging to a group of screen elements and wherein said plurality of screen elements are fixed in proximity to one another are movable on said publishing interface as a collective block;
   rendering an extent surrounding said grouped screen elements, said extent comprising at least one visible border element defining a region within a display of said publishing interface; and unlinking at least one layout element selected from said group of screen elements by a user, wherein said at least one unlinked layout element remains in said group and is movable on said publishing interface as a collective block with said group, and wherein said at least one unlinked layout element is not fixed in proximity to remaining screen elements of said group, and further wherein the extent is configured to automatically grow responsive to the user's movement of an unlinked layout element to a location beyond the at least one border element to a location outside the extent and also to automatically shrink responsive to the user's movement of an outermost unlinked screen element to a location closer to a center within the extent, said group including the same plurality of screen elements before and after said user's movement of the unlinked screen element.

6. The method of claim 5 wherein said designating comprises receiving input from a user that indicates which of said plurality of screen elements are associated with said group.

7. The method of claim 5 wherein said at least one border element comprises a line that resides adjacent to the outermost one of said screen elements positioned within said extent.

8. The method of claim 5 wherein said plurality of screen elements within said extent are designated with visual queues assigned to all of said screen elements comprising said family relationship.

9. The method of claim 5 wherein said extent runs across a plurality of pages of a document to be published.

10. The method of claim 5 wherein said plurality of screen elements designated as being within said group are freely moveable in a manner independent of one another.

11. The method of claim 5 wherein at least one border element of said extent functions as a mask and thereby obscures said plurality of screen elements that pass beyond said at least one border element.

12. The method of claim 5 further comprising inwardly adjusting at least one of said at least one border elements from said second position to a third position when at least one of said plurality of screen elements is moved inward towards the center of said extent.

13. A system, comprising:
a computer database storing a plurality of layout elements; and
a graphic user interface computer component coupled to the computer database, the graphic user interface computer component including a computer processor and a non-transitory computer-readable medium storing instructions adapted to be executed by the computer processor to perform a method, said method comprising:
obtain the plurality of initial layout elements from the computer database,
determine an association between at least two of said plurality of initial layout elements to derive a group comprising a plurality of associated layout elements, wherein said associated layout elements of said group are movable as a collective block while still maintaining an existing layout of said plurality of associated layout elements,
render an extent surrounding said plurality of associated layout elements, said extent comprising at least one visible border element displayed within a graphical user interface display, and
unlink at least one layout element selected from said group by a user, wherein said association is maintained such that said at least one unlinked layout element remains in said group and moves with said group as a collective block, and wherein said at least one unlinked layout element is individually movable independently from others of said plurality of associated layout elements, and further wherein the extent is configured to automatically grow responsive to the user's movement of an unlinked layout element to a location beyond the at least one border element to a location outside the extent and also to automatically shrink responsive to the user's movement of an outermost unlinked screen element to a location closer to a center within the extent, said group including the same plurality of layout elements before and after said user's movement of the unlinked layout element, and further wherein the extent does not surround at least one additional layout element.

* * * * *